(12) United States Patent
Ohshita et al.

(10) Patent No.: US 6,381,962 B1
(45) Date of Patent: May 7, 2002

(54) METHOD AND APPARATUS FOR GENERATING ELECTRIC POWER BY COMBUSTING WASTES

(75) Inventors: Takahiro Ohshita, Yokohama; Tetsuhisa Hirose; Nobuo Nakata, both of Tokyo; Koichi Takahashi, Yokohama, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/529,439

(22) PCT Filed: Oct. 14, 1998

(86) PCT No.: PCT/JP98/04641

§ 371 Date: Apr. 13, 2000

§ 102(e) Date: Apr. 13, 2000

(87) PCT Pub. No.: WO99/19667

PCT Pub. Date: Apr. 22, 1999

(30) Foreign Application Priority Data

Oct. 14, 1997 (JP) ............................................. 9-296313
Jun. 2, 1998 (JP) ............................................ 10-169286

(51) Int. Cl.$^7$ ............................................. F01K 13/00
(52) U.S. Cl. ........................................... 60/645; 60/670
(58) Field of Search ............................ 60/643, 645, 670

(56) References Cited

U.S. PATENT DOCUMENTS

| 4,099,382 A | | 7/1978 | Paull et al. | |
|---|---|---|---|---|
| 4,788,824 A | * | 12/1988 | Spurr et al. | ............... 60/670 X |
| 5,216,884 A | * | 6/1993 | Holsiepe | ................... 60/670 X |
| 5,603,218 A | * | 2/1997 | Hooper | ....................... 60/671 X |

FOREIGN PATENT DOCUMENTS

| EP | 0 671 587 | 9/1995 |
|---|---|---|
| JP | 5-98908 | 4/1993 |
| WO | 94/07006 | 3/1994 |
| WO | 97/37185 | 10/1997 |

* cited by examiner

*Primary Examiner*—Hoang Nguyen
(74) *Attorney, Agent, or Firm*—Wenderoth, Lind, & Ponack, L.L.P.

(57) ABSTRACT

Exhaust gas is generated when various waste products are combusted. The generated exhaust gas is introduced into a heat exchanger to heat an intermediate gas such as air by heat exchange. The heated intermediate gas is then used to heat superheated steam, which is then supplied to a steam turbine coupled to a generator.

60 Claims, 6 Drawing Sheets

METHOD AND APPARATUS FOR GENERATING ELECTRIC POWER BY COMBUSTING WASTES

TECHNICAL FIELD

The present invention relates to a method and apparatus for generating electric power by combusting waste products. More particularly, it relates to a method and apparatus for generating electric power at high efficiency from a high-temperature and high-pressure steam which is produced by using the heat of exhaust gas generated when various waste products are combusted, while avoiding heat exchanger problems caused by corrosion due to high-temperature molten salt.

BACKGROUND ART

It is expected that in the 21st century, the treatment of various waste products will change greatly from simple incineration to dioxin-free recycling system which can recover energy at high efficiency. Because more efforts will be directed to sorting waste products, the recycling technology according to the type of waste product will be desired. For example, a gasification and melt combustion system which is capable of simultaneously coping with the control of dioxin and melting of ash by using combustion heat generated when waste products are combusted is becoming the main option for treating general waste products. A chemical recycling technology which is capable of converting plastic-based waste products into raw material for chemicals is becoming the main option for treating plastic-based waste products. Highly efficient power generation by combustion of waste products will require a power generation efficiency of 30% or higher.

Present thermal recycling systems for generating electric power by using thermal energy produced by the combustion of wastes is generally carried out by recovering the combustion heat of waste products in the form of steam using a waste heat boiler and supplying the steam to a steam turbine to generate electric power by a generator driven by the steam turbine.

Figure 4:
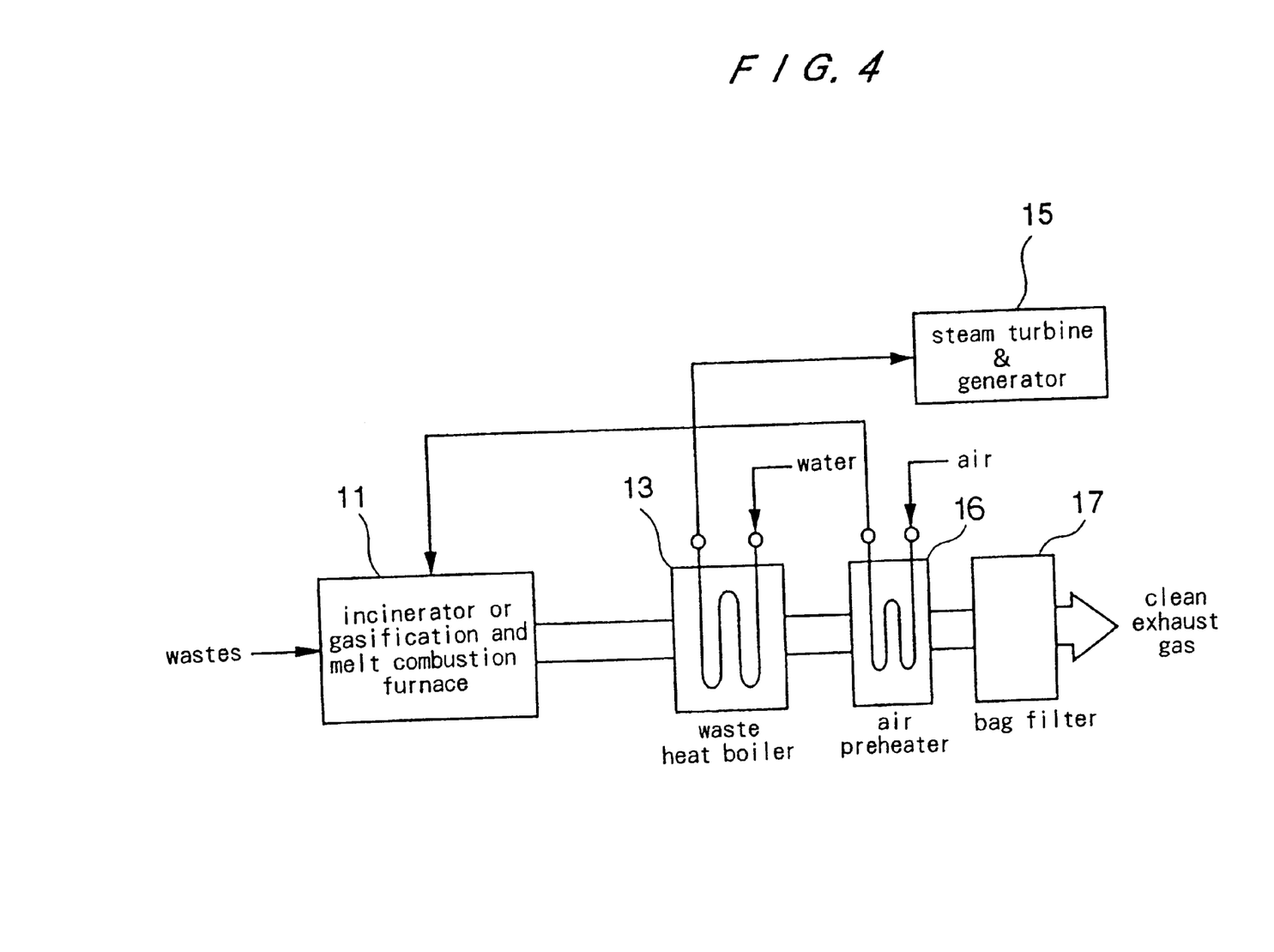
FIG. 4 is a flow diagram showing a conventional system for generating electric power by combusting waste products.

One example of a conventional power generation system based on waste incineration is shown in FIG. 4 of the accompanying drawings. As shown in FIG. 4, waste products are combusted in an incinerator or a gasification and melt combustion furnace 11, and the heat of generated exhaust gas is recovered by a waste heat boiler 13, which produces superheated steam. The superheated steam is supplied to a steam turbine 15 to which a generator is directly coupled, thus generating electric power. The generated electric power is consumed in the waste incineration facility, and is sold to the power company. The exhaust gas that has passed through the waste heat boiler 13 flows through a preheater 16 (such as an economizer) and a bag filter 17, and then is discharged through a stack into the atmosphere as low-temperature clean gas.

The efficiency of power generation in the conventional steam-turbine power generation system greatly depends on the temperature of the superheated steam supplied to the steam turbine. The efficiency of power generation is remarkably increased as the temperature of the superheated steam is increased. In the conventional practical system for power generating by waste incineration, the temperature of the superheated steam has been about 400° C. at maximum for the following reason, and the efficiency of power generation has been about 20% at most.

Heretofore, the temperature of the superheated steam has not been increased beyond about 400° C. because of corrosion caused by corrosive gas such as hydrogen chloride produced during waste combustion and corrosion caused by a high-temperature molten salt. As for the waste heat boiler, since saturated steam having a relatively low temperature, e.g. about 310° C. flows through water pipes even under the pressure of about 100 kg/cm², corrosion of the water pipes can be prevented even if metal pipes are used. However, in the case of superheated steam, since the temperature of superheated steam is a high temperature of 400° C. or higher, the surface of the heat transfer metal pipes will be damaged by corrosion caused by corrosive component such as high-temperature molten salt.

The mechanism of corrosion is complicated and the corrosive reaction is affected by a combination of various factors. The most important factor for the corrosion of the heat transfer tube is whether the heat transfer tube is exposed to an environment containing molten salt of NaCl and/or KCl, rather than the concentration of HCl. Under this environment, salts are melted, adhere to the heat transfer tubes and accelerate the corrosion thereof.

Figure 5:
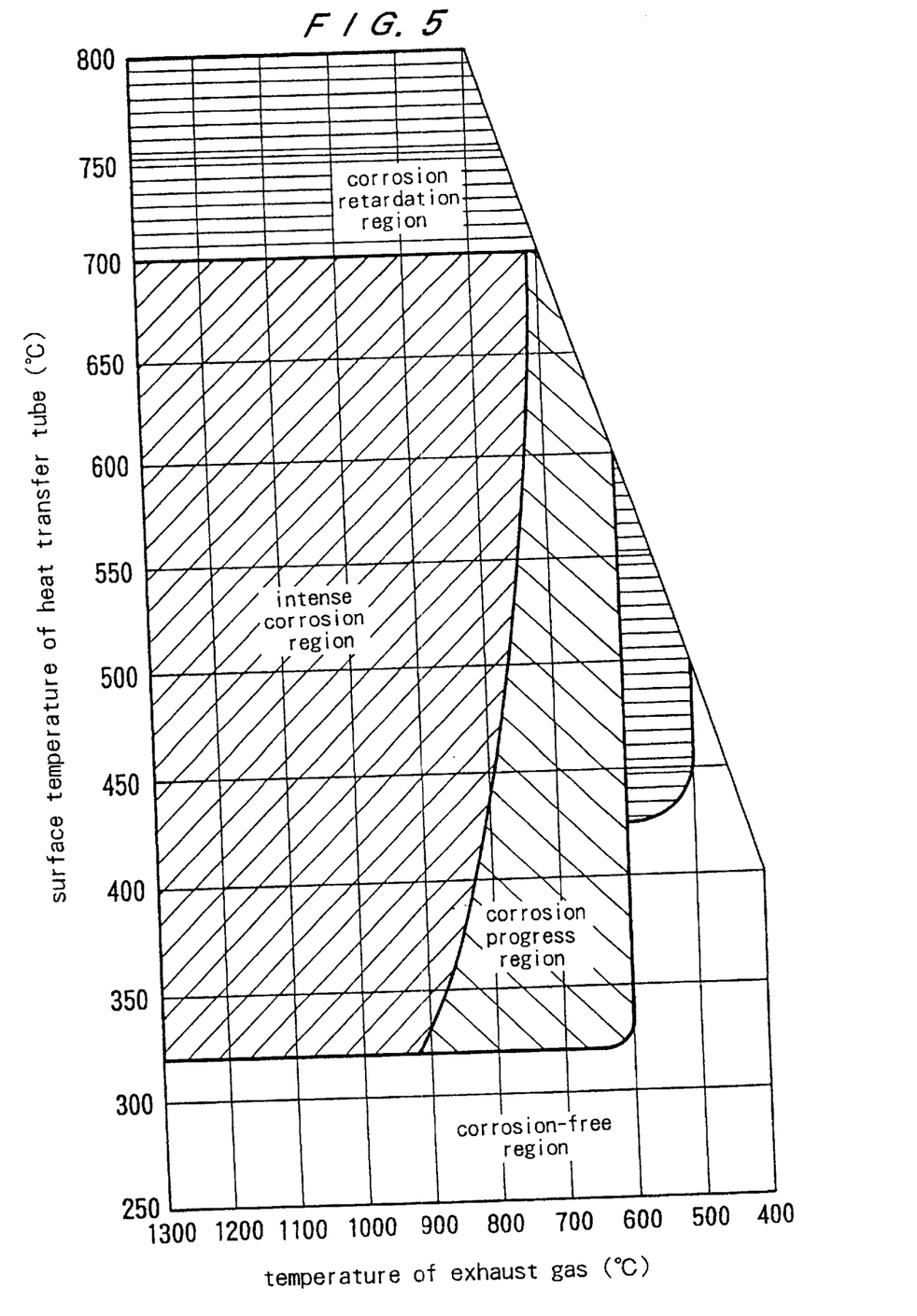
FIG. 5 is a diagram showing corrosion regions depending on the temperature of exhaust gas and the surface temperature of a heat transfer tube.

FIG. 5 shows different forms of corrosion depending on the temperature of exhaust gas (represented on the horizontal axis) produced by combustion of wastes and the surface temperature of a heat transfer tube (represented on the vertical axis), deduced from the long experience of the inventors and a corrosion test using a municipal waste incinerator. As shown in FIG. 5, there are four forms, i.e., "intense corrosion region", "corrosion progress region", "corrosion retardation region", and "corrosion-free region". When the temperature of superheated steam is 400° C., the surface temperature of the heat transfer tube is about 430° C. which is higher than the temperature of superheated steam by about 30° C. At this temperature, the temperature of exhaust gas of 600° C. or thereabout is considered to be a boundary temperature separating the "corrosion progress region" and the "corrosion-free region" from each other. This coincides with the fact that when the temperature of exhaust gas entering a boiler bank where steam pipes are gathered closely is 600° C. or higher in the waste heat boiler of a municipal waste incinerator, salts adhere to heat transfer tubes causing exhaust gas passages to be clogged. Therefore, the boundary temperature between when salts are melted or solidified is considered to be about 600° C. This temperature corresponds to the melting point of complex salts. The melting point of NaCl is 800° C., and the melting point of KCl is 776° C. However, salts turn into complex salts after being melted, and their melting point is lowered, e.g., to the range of 550 to 650° C. This melting point varies with the properties of the waste products which differ from place to place. For example, this boundary temperature may be lower than 600° C. in local cities close to seashores, because salts are present at higher concentration in the waste products. Even if the temperature of exhaust gas is in the range of 500 to 600° C., when the surface temperature of the heat transfer tube is equal to or higher than about 430° C., its environment belongs to the "corrosion retardation region", and the heat transfer tube suffers slight corrosion, less intense than molten-salt corrosion. Accordingly, the selection of the superheater tube material for use at the boundary temperature is of importance. Inasmuch as the surface temperature of the heat transfer tube is about 30° C. higher than the temperature of the superheated steam, the temperature of the superheated steam, which is about 400° C., is considered to be an allowable temperature limit for preventing corrosion. If the temperature of the superheated steam is 400° C., the pressure of the steam is suppressed to about 3.9 MPa on account of the problem of a turbine drain attack. Hence, the efficiency of power generation is only about 20% in the waste incinerating power generating system.

In order to obtain superheated steam at a temperature of 400° C. or higher while avoiding the "corrosion progress region", it is necessary to install superheated steam pipes in the condition that the temperature of exhaust gas is in the range, of 500 to 600° C. Such a method is disadvantageous, however, in that since the temperature difference between the exhaust gas and the superheated steam is small, in order to obtain a desired amount of heat transfer, the required heat transfer surface is too large, resulting in a large-size heat recovery facility.

On the other hand, attempts have heretofore been made to develop corrosion-resistant metallic materials for the purpose of higher power generation efficiency by increasing the steam temperature without corrosion of the heat transfer tube. However, such attempts at material development are technically and economically so burdensome that practically no satisfactory results have been obtained yet. Another effort is to develop an RDF power generation system in which waste products are added with lime and converted into solid fuel for dechlorination and desulfuiization. Although the RDF power generation system is capable of reducing HC1 in the exhaust gas, it fails to reduce the molten-salt corrosion. From FIG. 5, in the case where the superheated steam having a temperature of 500° C. is obtained by the exhaust gas having a temperature of 800° C. or higher, the surface temperature of the heat transfer tube is about 530° C., so that the heat transfer tube is exposed to the "intense corrosion region".

There has been proposed a system, the so-called advanced waste power generating system, in which electric power is generated by a gas turbine and the steam from a waste heat boiler is reheated by the exhaust gas from the gas turbine to thereby increase the efficiency of power generation in a steam-turbine. However, the proposed system is problematic in that it consumes a lot of another high-quality fuel other than waste products and is not economical. Another proposed system is such a system in which the steam from a waste heat boiler is reheated by combusting high-quality fuel to increase the efficiency of power generation in a steam turbine. This system is also economically problematic because it consumes a lot of another high-quality fuel other than waste products.

SUMMARY OF THE INVENTION

It is therefore an object of the present invention to provide a method and apparatus for generating electric power by combusting waste products which is capable of increasing the temperature of superheated steam for increased power generation efficiency without the problem of corrosion of a heat exchanger caused by corrosive components such as high-temperature molten salts contained in combustion gas of waste products.

According to one aspect of the present invention, there is provided a method for generating electric power by combusting wastes, the method comprising: combusting waste products to generate exhaust gas having a high temperature; introducing the exhaust gas into a heat exchanger to heat an intermediate gas by heat exchange; heating superheated steam by utilizing the heated intermediate gas as a heat source; and supplying the heated superheated steam to a steam turbine coupled to a generator to generate electric power.

According to another aspect of the present invention, there is provided an apparatus for generating electric power by combusting waste products, the apparatus comprising: a combustor for combusting wastes to generate exhaust gas having a high temperature; a heat exchanger for heating an intermediate gas by heat exchange between the exhaust gas from the combustor and the intermediate gas; a heater for heating superheated steam by heat exchange between the heated intermediate gas and the superheated steam; and a steam turbine coupled to a generator, the heated superheated steam being supplied to the steam turbine to generate electric power.

According to the present invention, exhaust gas produced by waste combustion is introduced into the heat exchanger where an intermediate gas such as air flowing through heat transfer tubes is heated by heat exchange. Then superheated steam obtained by a waste heat boiler or the like is heated by utilizing the heated intermediate gas as a heat source, and the superheated steam heated by the intermediate gas is supplied to the steam turbine coupled to the generator to generate electric power. That is, the exhaust gas is not introduced into the waste heat boiler directly to heat superheated steam, but the exhaust gas is introduced into the heat exchanger to heat an intermediate gas such as air and the superheated steam is heated by the heated intermediate gas. The heat exchanger which heats the intermediate gas such as air by exhaust gas is not required to be under high pressure. Hence, it is unnecessary for the heat exchanger to use materials which are laid down by standards such as a boiler-structure standard or a technical standard for the power plant. Thus, ceramic material can be used as material for the heat exchanger. If ceramic material is used for the heat transfer tubes in the heat exchanger, they are hardly susceptible to corrosion caused by molten salt. Even in the case where a heat exchanger made of heat resisting cast steel or metal is used, the heat transfer tubes which are exposed to exhaust gas can be used under environment of the "corrosion retardation region" shown in FIG. 5, thus hardly causing the problem of molten salt corrosion. Specifically, although the heat resisting cast iron has been known as material having corrosion resistance, it has not been able to be used as a steam pipe through standards in the conventional method. However, the heat resisting cast iron will be able to be used in the present invention because it is used not as a steam pipe but as a heat transfer pipe between the exhaust gas and intermediate gas such as air.

According to the above-mentioned present invention, the high temperature exhaust gas heats intermediate gas such as air which flows through the heat transfer tubes. Corrosive components contained in the exhaust gas hardly cause high-temperature molten-salt corrosion of the tubes when the surface temperature of the tubes is 700° C. or higher. When the surface temperature of the heat transfer tubes is about 700° C. or higher, the corrosion of the tubes is small because the surrounded environment is in the "corrosion retardation region" shown in FIG. 5. Consequently, even if the heat transfer tubes in the high-temperature heat exchanger are made of metal, gas such as air flowing through the tubes can be heated to a high temperature of about 700° C., for example. It is possible to easily generate superheated steam having a temperature of about 500° C. by reheating the superheated steam which has been heated to about 400° C. in a waste heat boiler with the intermediate gas such as air having a temperature of about 700° C. Since the superheated steam is reheated not by the exhaust gas but by high-temperature intermediate gas such as air, the problem of high-temperature molten-salt corrosion does not occur. Because the high-temperature intermediate air is used as a heat source instead of exhaust gas, lowering of heat transfer coefficient due to adhesion of dust to the heat transfer tubes does not occur. Thus, the superheated steam heater may be relatively downsized. The superheated steam thus reheated is supplied to the steam turbine coupled to a generator, which can generate electric power with an efficiency of 30% or higher.

Figure 6:
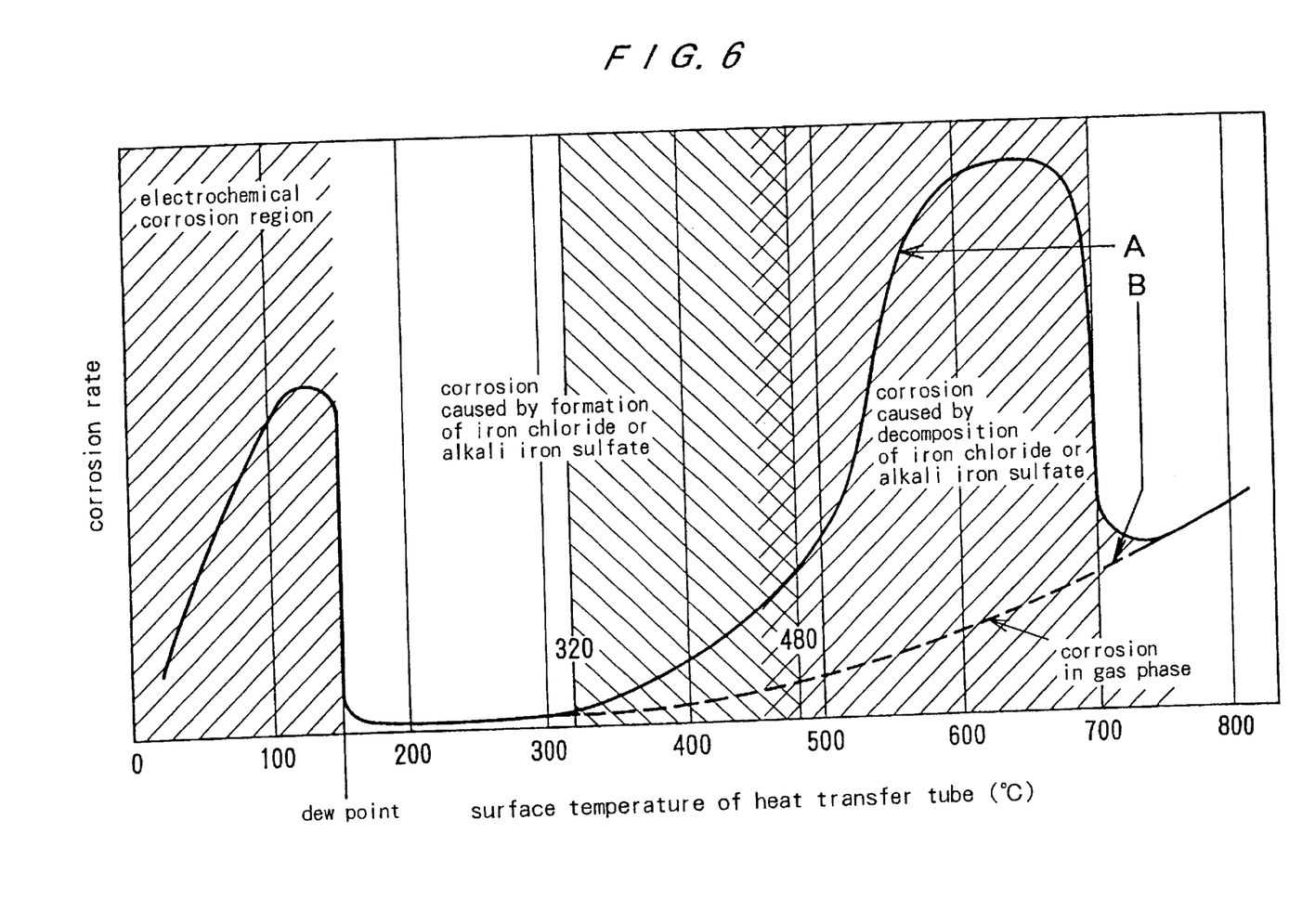
FIG. 6 is a diagram showing the relationship between corrosion rate and surface temperature of heat transfer tube.

FIG. 6 shows corrosion rates of heat transfer tubes in a conventional system for heating superheated steam directly with exhaust gas and a system for heating superheated steam indirectly with exhaust gas according to the present invention. With the conventional system as shown by the curve A in FIG. 6, since the film heat transfer coefficient at the steam side is large, the surface temperature of the tubes is close to the steam temperature, so that the tubes are exposed to the "intense corrosion region". With the system according to the present invention as shown by the curve B in FIG. 6, intermediate gas such as air instead of steam is heated by the exhaust gas. In case of air, since the film heat transfer coefficient at the air side is much smaller than that at the steam side, the surface temperature of the tubes is close to the exhaust gas temperature, so that the tubes are exposed to the "corrosion retardation region" shown in FIG. 5. Inasmuch as the system for heating the superheated steam indirectly with the exhaust gas can avoid high-temperature molten-salt corrosion, the tubes which are made of an existing metallic material can be used.

Next, the difference in the surface temperature of the heat transfer tube which is caused by the difference of the film heat transfer coefficient will be described.

The surface temperature of the heat transfer tube Tw is calculated by the following equation.

$$Tw=T-\{hio/(hio+ho)\}\times(T-t)$$

where T=temperature of exhaust gas
t=temperature of intermediate gas which receives heat
ho=film heat transfer coefficient of exhaust gas
hio=film heat transfer coefficient of fluid gas which receives heat 1) If superheated steam is used as heat receiving fluid
Assuming that T=1200° C., t=500° C., ho≈100 kcal/m²h° C., and hio≈2000 kcal/m²h° C. (very large value in case of the superheated steam), Tw=1200−{2000/(2000+100)}×(1200−500)=533° C.

Thus, the heat transfer tubes are exposed to the "intense corrosion region".

2) If intermediate air is used as heat receiving fluid
Assuming that T=1200° C., t=500° C., ho≈100 kcal/m²h° C., and hio≈200 kcal/M²h° C. (small value in case of gas such as air), Tw=1200−{200/(200+100)}×(1200−500)=733° C.

Thus, the intense corrosion of the heat transfer tubes is avoidable.

Further, since low-pressure air can be used as the heating medium, the tubes may be made of ceramic material. Whether the tubes are to be made of metallic material or ceramic material is determined depending on conditions in which they are used. For example, if the surface temperature of the tubes is 800° C. or higher, the tubes are preferably made of ceramic material or heat-resistant cast steel.

The above and other objects, features, and advantages of the present invention will become apparent from the following description when taken in conjunction with the accompanying drawings which illustrate preferred embodiments of the present invention by way of example.

DETAILED DESCRIPTION OF THE INVENTION

Figure 1:
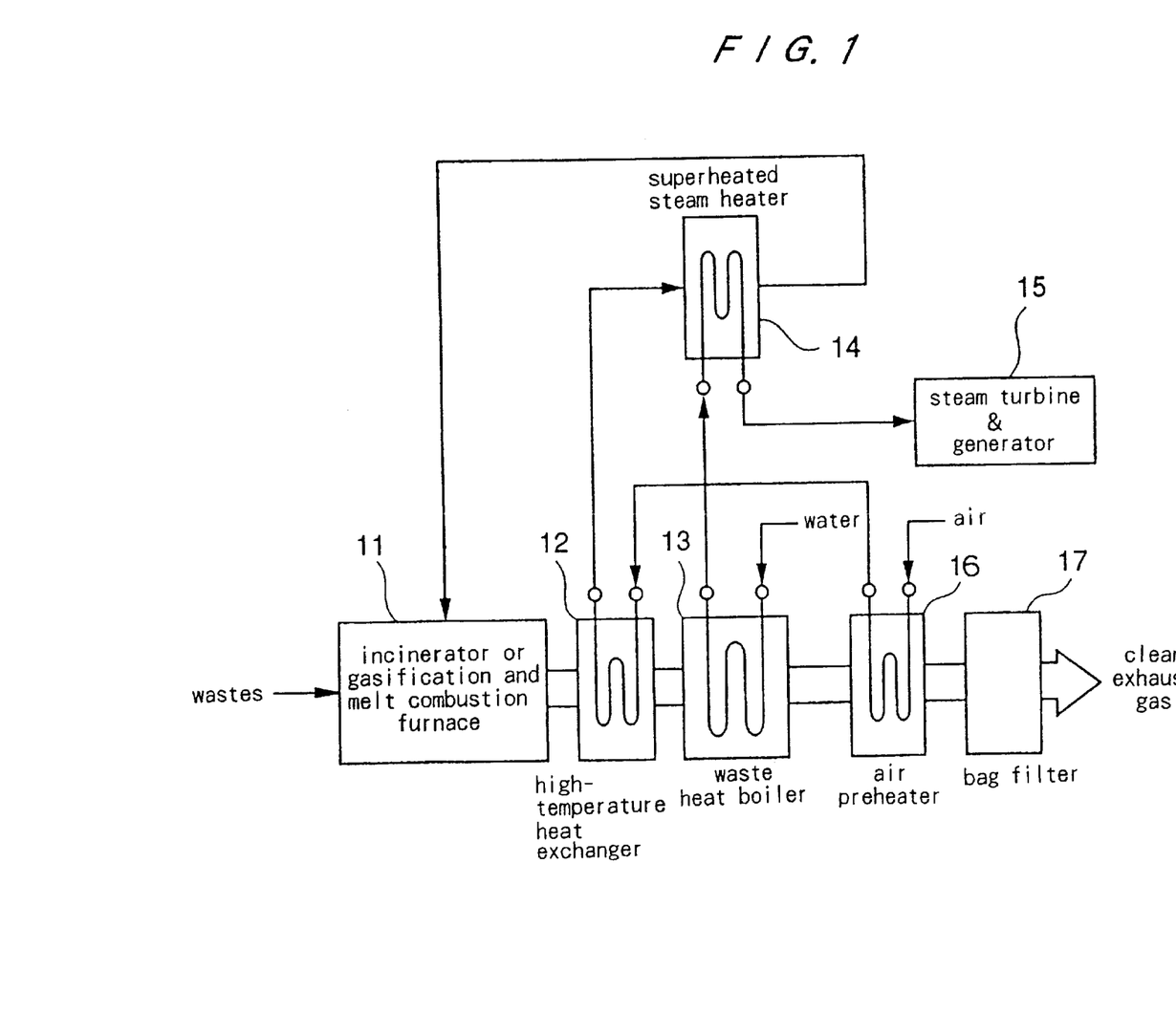
FIG. 1 is a flow diagram showing a system for generating electric power by combusting waste products according to an embodiment of the present invention.

FIG. 1 shows a flow diagram of a system for generating electric power by combusting waste products according to an embodiment of the present invention.

As shown in FIG. 1, in an incinerator or a gasification and melt combustion furnace 11, waste products are combusted to generate exhaust gas. The generated exhaust gas passes through a high-temperature heat exchanger 12 made of heat-resistant metal or ceramics to heat intermediate fluid gas such as air preferably up to a temperature of about 700° C. The exhaust gas that has passed through the high-temperature heat exchanger 12 is supplied to a waste heat boiler 13, which generates steam from water supplied thereto. The generated steam is heated, and the superheated steam having a steam pressure of about 100 kg/cm² and a temperature of about 400° C. is obtained. The superheated steam is supplied to a superheated steam heater 14 in which the superheated steam is heated up to about 500° C. by heat exchange with the heated intermediate fluid gas such as air having a temperature of about 700° C. from the high-temperature heat exchanger 12. The superheated steam thus heated by the superheated steam heater 14 is supplied to a steam turbine 15 directly coupled to a generator to generate electric power.

The exhaust gas that has passed through the waste heat boiler 13 is introduced into an air preheater 16 where the exhaust gas preheats intermediate fluid gas such as air that is to be supplied to the high-temperature heat exchanger 12. The exhaust gas also heats water in an economizer, and the heated water is. supplied to the waste heat boiler 13. The exhaust gas, whose temperature has been lowered, is discharged from the preheater 16 and is then filtered by a bag filter 17. The exhaust gas then is discharged as clean exhaust gas from a stack.

As described above, the high-temperature heat exchanger 12 is provided in a high-temperature exhaust gas line in which the exhaust gas discharged from the incinerator or the gasification and melt combustion furnace 11 flows. In the high-temperature heat exchanger 12, intermediate gas such as air is heated to a temperature of 500° C. or higher, preferably about 700° C. The heated air is then supplied to the superheated steam heater 14 in which the superheated steam having a temperature of 400° C. is heated up to a temperature of about 500° C. The superheated steam heated by the superheated steam heater 14 is supplied to the steam turbine 15 directly. coupled to the generator, which then generates electric power. The intermediate gas such as air which has heated the superheated steam is supplied from the superheated steam heater 14 to the incinerator or the gasification and melt combustion furnace 11 as combustion air.

Since the temperature of exhaust gas emitted from incinerator 11 is about 850° C., the high-temperature heat exchanger 12 requires a relatively large heat transfer area because the temperature difference between the exhaust gas and the air is small. However, inasmuch as the temperature of exhaust gas emitted from the gasification and melt combustion furnace 11 is 1200° C. or higher, the heat transfer area in the high-temperature heat exchanger 12 may be small because the temperature difference between the exhaust gas and the air is large. As an intermediate gas for heating medium from the exhaust gas, air or inert gas such as nitrogen is preferable.

Figure 2:
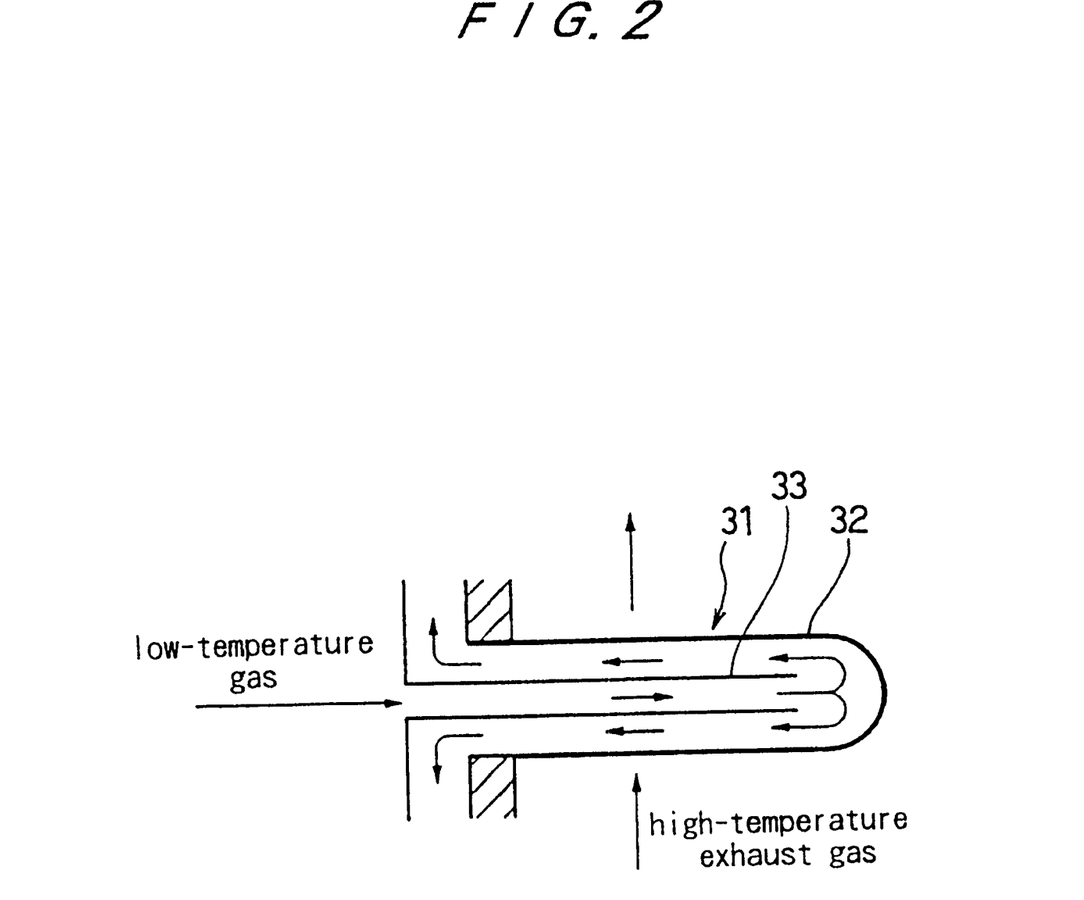
FIG. 2 is a cross-sectional view of a bayonet type heat exchanger.

FIG. 2 shows a bayonet type heat exchanger for use as the high-temperature heat exchanger 12. The bayonet type heat exchanger comprises a number of heat exchange portions 31 having a duplex-tube structure. In FIG. 2, a single duplex-tube heat exchange portion 31 is shown. The heat exchange portion 31 comprises an outer tube 32 having a cylindrical receptacle shape with one open end and another closed end, and an inner tube 33 having a cylindrical shape with opposite open ends. The high-temperature exhaust gas contacts the outer surface of the outer tube-32. The low-temperature intermediate gas such as air is introduced into the inner tube 33 from one end of the inner tube 33 and is discharged from the opposite end of the inner tube 33. The intermediate gas flows into the annular space between the inner tube 33 and the outer tube 32, and then flows out from the open end of the outer tube 32. In the meantime, the gas such as air is heated by heat exchange with the exhaust gas. Since the bayonet type heat exchanger is provided with the duplex-tube heat exchange portions 31, the heat exchange between the exhaust gas and the intermediate gas is conducted in a two-stage manner. To be more specific, the two-stage heat exchange comprises a first-stage heat exchange conducted between gas flowing through the inner tube 33 and gas flowing through the annular space between the outer tube 32 and the inner tube 33, and a second-stage heat exchange conducted between the exhaust gas flowing outside of the outer tube 32 and the gas flowing through the annular space between the outer tube 32 and the inner tube 33. Since the low-temperature intermediate gas is heated by the first-stage heat exchange, the surface temperature of the outer tube 32 contacts the exhaust gas and heated during the second-stage heat exchange becomes rather high. Hence, the "intense corrosion region" is avoidable. Further, the heat exchange portion 31 is exposed to a high-temperature environment to cause relatively large linear expansion of the heat exchange portion. If the heat exchange portion is fixed at both ends thereof, troublesome measurement of the linear expansion is required to be taken. However, the heat exchange portion of this embodiment is of a cantilevered structure to thus make the structure simple.

As for heat resisting cast steel for the bayonet type heat exchanger, SCH in JIS (Japanese Industrial Standard) is desirable, and as for metal, a heat-resistant alloy with high nickel (Ni), cobalt (Co), and chromium (Cr) contents is desirable. In case of ceramics, silicon carbide (Sic) is preferable. When material pieces of Sic, alumina, and silicon nitride were exposed to high-temperature exhaust gas having a temperature of about 1350° C. discharged from a gasification and melt combustion furnace for one month, the material pieces of alumina and silicon nitride were completely melted away, but the material piece of Sic retained its original shape though its thickness was reduced from 10 mm to 5 mm. Specifically, the reduction in the thickness of the material piece of Sic was greater in the strong stream of the exhaust gas, i.e., in a direction of the stream of the exhaust gas, and smaller in the weak stream of the exhaust gas. When the surface temperature of the material piece of Sic was 1000° C. or lower, almost no reduction occurred in the direction of the stream of the exhaust gas.

It can be found from the above experimental results that the service life of the high-temperature heat exchanger 12 can be greatly extended when it is made of Sic and the surface temperature thereof is 1000° C. or lower.

Although the high-temperature heat exchanger 12 is not limited to a bayonet type heat exchanger, it is preferable to use a bayonet type heat exchanger which is capable of heating low-temperature fluid with high-temperature fluid to increase the temperature of a heat transfer surface that is exposed to the exhaust gas.

Two or more heat exchangers may be employed and its structure may be changed for medium-temperature and for high-temperature. For example, the medium-temperature heat exchanger may be arranged to heat air from about 250° C. to about 500° C., and the high-temperature heat exchanger may be arranged to heat air from about 500° C. to 700° C. With this arrangement, the medium-temperature heat exchanger may be a bayonet type heat exchanger, and the high-temperature heat exchanger may be an ordinary heat exchanger of another type. The reason is that when the air temperature is about 500° C., the surface temperature of the heat transfer tube is 700° C. or higher, thus entering the "corrosion retardation region" shown in FIG. 5. On the contrary, the high-temperature heat exchanger may be a bayonet type heat exchanger made of ceramic material.

Figure 3:
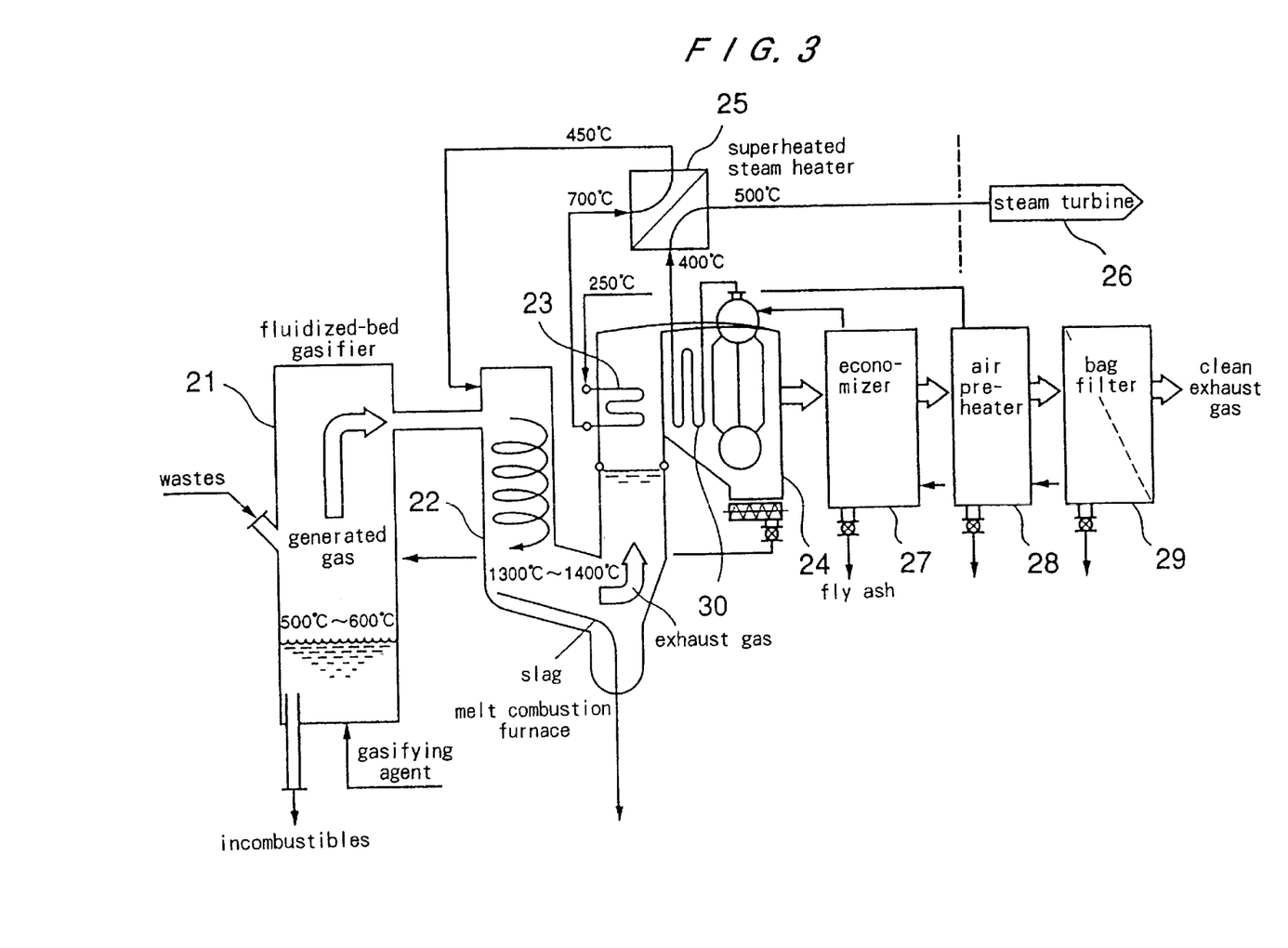
FIG. 3 is a flow diagram showing a system for generating electric power by combusting waste products according to another embodiment of the present invention.

FIG. 3 shows a flow diagram of a system for generating electric power by combustion of waste products according to another embodiment of the present invention. According to the embodiment shown in FIG. 3, a fluidized-bed gasifier and a swirling type melt combustion furnace are employed to gasify and combustion waste products.

As shown in FIG. 3, waste products are charged into a fluidized-bed gasifier 21 and gasified by being heated to a temperature ranging from 500 to 600° C. in such a condition that the total amount of oxygen is lower than the theoretical amount of oxygen required for combustion of waste products. In the fluidized-bed gasifier 21, the temperature of the fluidized bed is low and the fluidized bed is in a reducing atmosphere. Therefore, metals including iron, copper and aluminum can be recovered in an unoxidized state. The pyrolysis gas containing char and tar, which is generated in the fluidized-bed gasifier 21, is supplied to a swirling type melt combustion furnace 22 in which the supplied gas is combusted at a high temperature of 1350° C. or higher, without supplying auxiliary fuel. The combustion temperature may be in the range of 1200 to 1500° C. Since gas combustion is mainly carried out in the swirling type melt combustion furnace 22, a low excess air ratio of about 1.3 is possible and thereby reduces the amount of exhaust gas discharged from the swirling type melt combustion furnace 22. Because the gas is combusted at a temperature of 1200° C. or higher, it is possible to decompose dioxins completely. In the swirling type melt combustion furnace 22, a swirling flow is formed to separate slag efficiently by the effect of centrifugal forces, and harmful materials such as heavy metals are contained in the slag. The slag is then cooled to glassy solid matter so as to seal heavy metals.

A waste heat boiler 24 for generating superheated steam is connected to the swirling type melt combustion furnace 22, and a high-temperature heat exchanger 23 is disposed in a radiation heat transfer section in the waste heat boiler 24. The high-temperature heat exchanger 23 comprises tubes made of heat-resistant cast steel or heat-resistant metal or Sic, and serves to heat preheated intermediate air having a temperature of 150 to 300° C. and flowing through the tubes up to a temperature ranging from 500 to 800° C., preferably a temperature of about 700° C. At this time, the temperature of the exhaust gas is in the range of 1000 to 1300° C., preferably about 1200° C. to prevent ashes from being deposited on the tubes of the high-temperature heat exchanger 23. Since the temperature difference between the air flowing in the high-temperature heat exchanger 23 and the exhaust gas is large, the heat transfer area of the high-temperature heat exchanger 23 may be small. Hence, the high-temperature heat exchanger may be compact in size. The tubes of the high-temperature heat exchanger 23 do not need to be of a pressure-retaining structure as the air flows through the tubes at a low pressure of 2 kg /cm$^2$ or lower, preferably about 0.05 kg/cm$^2$. Consequently, the tubes of the high-temperature heat exchanger 23 may be made of ceramics or cast steel. The location of the high-temperature heat exchanger 23 is not limited to the radiation heat transfer section of the waste heat boiler 24, but may be anywhere between the swirling type melt combustion, furnace 22 and the waste heat boiler 24. For example, a duct may be provided downstream of the swirling type melt combustion furnace 22, and the high-temperature heat exchanger 23 may be installed in the duct.

The air heated to a temperature ranging from 500 to 800° C., preferably a temperature of about 700° C. by the high-temperature heat exchanger 23 is supplied to a superheated steam heater 25 where superheated steam having a temperature of about 400° C. from the waste heat boiler 24 is heated to a temperature ranging from 400 to 600° C., preferably a temperature of about 500° C. The air whose temperature has dropped by heating the superheated steam is supplied, as combustion air to the swirling type melt combustion furnace 22. Since the combustion air thus supplied has a relatively high temperature ranging from 350 to 550° C., preferably a temperature of about 450° C., high-temperature combustion is carried out efficiently in the swirling type melt combustion furnace 22. The superheated steam heated to a temperature of 400 to 600° C., preferably about 500° C., by the superheated steam heater 25 is supplied under a pressure of about 100 kg/cm$^2$ to a steam turbine 26 directly coupled to a generator, which generates electric power.

With this arrangement, the system for generating electric power by combusting waste products is capable of generating electric power with an efficiency ranging from 30 to 32% while avoiding the problem of corrosion caused by a high-temperature molten salt. As the temperature of superheated steam becomes higher, the power generation efficiency increases. Since it is possible to increase the temperature of the superheated steam to 500° C. or higher by the superheated steam heater 25, the system for generating electric power by combusting wastes is capable of generating electric power with a higher efficiency.

The waste heat boiler 24 has tubes 30 for generating superheated steam having a temperature of about 400° C. by contacting the exhaust gas whose temperature has dropped to about 600° C. due to the heat exchange in the high-temperature heat exchanger 23. When the temperature of the exhaust gas falls to about 600° C., the exhaust gas does not cause the problem of high-temperature molten salt corrosion as can be seen from FIG. 5. The temperature of the exhaust gas at the outlet of the waste heat boiler 24 is about 350° C., and the discharged exhaust gas is supplied to an economizer 27, which preheats water to be supplied to the waste heat boiler 24. The exhaust gas discharged from the economizer 27 is then supplied to an air preheater 28, which preheats air to be supplied to the high-temperature heat exchanger 23 to a temperature of about 150 to 300° C. The exhaust gas, whose temperature has dropped to about 160° C., is discharged from the air preheater 28 and filtered by a dust collector 29 such as a bag filter, and is then discharged as clean exhaust gas from a stack into the atmosphere.

Since the gasification and melting combustion system can be operated at a low excess air ratio, a high boiler efficiency can be achieved, electric power consumption in a draft equipment can be reduced greatly, and electric power for ash melting furnace is unnecessary, thus improving the efficiency in the power transmission. Highly efficient thermal recycling is characterized by highly efficient power transmission, rather than highly efficient power generation. The gasification and melt combustion system can be operated without using auxiliary fuel, and hence the system is highly economical. The following Table 1 shows a. comparison of various systems including power transmission efficiencies.

TABLE 1

| Item | | System A | System B | System C |
|---|---|---|---|---|
| (1) | Fuel | Wastes | Wastes | Wastes |
| (2) | Heating value kcal/kg | 3500 | 3500 | 3500 |
| (3) | Superheated steam to steam turbine | 100 ata × 540° C. | 40 ata × 400° C. | 100 ata × 500° C. |
| (4) | Power generation efficiency | 35% | 24% | 31% |
| (5) | Generated power | 1424 kW | 977 kW | 1262 kW |
| (6) | Consumed power | | | |
| [1] | Equipment | 130 kW | 110 kW | 120 kW |
| [2] | Ash melting | 230 kW | 0 kW | 0 kW |
| | 190 kg of ashes 1200 kW/t (ashes) | | | |
| (7) | Transmitted power [(5)–(6)] | 1064 kw | 867 kW | 1142 kW |
| (8) | Power transmission efficiency | 26.1% | 21.3% | 28.1% |

[0050] System A: Incinerator + electric ash melting
[0051] System B: Gasification and melt combustion - I
[0052] System C: Gasification and melt combustion - II
[0053] *The amount of electric power indicated in Table 1 is an amount per 1 ton of waste products.

In the Table 1, 100 ata×540° C., 40 ata×400° C. and 100 ata×500° C. represent the pressure and temperature of the superheated steam in the respective systems. The Table 1 shows that the gasification and melt combustion system for generating electric power by using high-pressure and high-temperature superheated steam (100 ata×500° C.) achieved 28.1% of the power transmission efficiency, which is the highest efficiency. The system of the combination of the incinerator and the ash melting furnace achieved the highest power generation efficiency by utilizing the superheated steam obtained by the present invention, but the power transmission efficiency thereof was lowered to 26.1% because the large amount of power is consumed in the ash melting furnace. The conventional gasification and melt combustion system for generating electric power by using superheated steam (40 ata×400° C.) which was heated directly by exhaust gas achieved the lowest power generation efficiency and the lowest power transmission efficiency.

According to the present invention, pipes made of heat-resistant cast steel or alloy, or ceramic material are placed in high-temperature combustion exhaust gas to heat gas such as air, and the heated gas such as air is used to reheat superheated steam by heat exchange. It is possible to obtain superheated steam having a temperature of about 500° C. or higher by using the exhaust gas containing corrosive components while avoiding the problem of corrosion caused by a high-temperature molten salt, so that a power generation efficiency of 30% or higher can be achieved.

Although certain preferred embodiments of the present invention have been shown and described in detail, it should be understood that various changes and modifications may be made therein without departing from the scope of the appended claims.

INDUSTRIAL APPLICABILITY

The present invention is applied to a waste treatment facility in which electric power is generated at high efficiency from a high-temperature and high-pressure steam which is produced with the heat of exhaust gas generated when various wastes are combusted.

What is claimed is:

1. A method for generating electric power by combusting waste products, the method comprising:

combusting waste products in an incinerator to generate exhaust gas having a high temperature;

introducing said exhaust gas into a heat exchanger to heat an intermediate gas by heat exchange;

introducing said exhaust gas from said heat exchanger into a waste heat boiler to generate a superheated steam;

introducing said superheated steam from said waste heat boiler into a superheated steam heater;

introducing said heated intermediate gas into said superheated steam heater to heat said superheated steam;

supplying said heated superheated steam to a steam turbine coupled to a generator to generate electric power; and supplying said heated intermediate gas from said superheated steam heater into said incinerator after said heated intermediate gas heats said superheated steam.

2. A method according to claim 1, wherein heat transfer tubes of said heat exchanger which contact with said exhaust gas comprises one of heat-resistant cast steel and ceramics.

3. A method according to claim 1, wherein heat transfer tubes of said heat exchanger which contact with said exhaust gas comprises heat-resistant metal.

4. A method according to claim 1, wherein said heat exchanger comprises a bayonet type heat exchanger.

5. A method according to claim 1, wherein the surface temperature of heat transfer tubes of said heat exchanger is maintained at 700° C. or higher.

6. A method according to claim 1, wherein said intermediate gas comprises air, and said air is preheated by said exhaust gas from said waste heat boiler in an air preheater before being supplied to said heat exchanger.

7. An apparatus for generating electric power by combusting waste products, the apparatus comprising:

an incinerator for combusting waste products to generate exhaust gas having a high temperature;

a heat exchanger downstream of said incinerator and connected to said incinerator so as to receive said exhaust gas from said incinerator for heating an intermediate gas by heat exchange between said exhaust gas discharged from said incinerator and said intermediate gas;

a waste heat boiler downstream of said heat exchanger and connected to said heat exchanger so as to receive said exhaust gas from said heat exchanger for generating a superheated steam;

a heater connected to said waste heat boiler so as to receive said superheated steam and connected to said heat exchanger so as to receive said heated intermediate gas for heating said superheated steam by heat exchange between said heated intermediate gas and said superheated steam;

a steam turbine downstream of said heater and coupled to a generator, said heated superheated steam being supplied to said steam turbine to generate electric power; and a line for supplying said heated intermediate gas discharged from said superheated steam heater into said incinerator.

8. An apparatus according to claim 7, wherein heat transfer tubes of said heat exchanger which contact with said exhaust gas comprises one of heat-resistant cast steel and ceramics.

9. An apparatus according to claim 7, wherein heat transfer tubes of said heat exchanger which contact with said exhaust gas comprises heat-resistant metal.

10. An apparatus according to claim 7, wherein said heat exchanger comprises a bayonet type heat exchanger.

11. An apparatus according to claim 7, wherein the surface temperature of heat transfer tubes of said heat exchanger is maintained at 700°C. or higher.

12. An apparatus according to claim 7, wherein said intermediate gas comprises air.

13. An apparatus for generating electric power by combusting waste products, the apparatus comprising:

an incinerator for cobusting waste products to generate exhaust gas having a high temperature;

an air preheater for receiving said exhaust gas, wherein air is preheated by said exhaust gas in said air preheater;

a heat exchanger downstream of said incinerator and connected to said incinerator and said air preheater so as to receive said exhaust gas from said incinerator for heating said preheated air by heat exchange between said exhaust gas discharged from said incinerator and said preheated air so as to generate heated air, and so as to supply said exhaust gas received from said incinerator into said air preheater;

a waste heat boiler downstream of said heat exchanger and connected to said heat exchanger so as to receive said exhaust gas from said heat exchanger for generating a superheated steam;

a heater connected to said waste heat boiler so as to receive said superheated steam and connected to said heat exchanger so as to receive said heated air for heating and superheated steam by heat exchange between said heated air and said superheated steam;

a steam turbine downstream of said heater and coupled to a generator, said heated superheated steam being supplied to said steam turbine to generate electric power, and a line for supplying said heated air discharged from said heater into said incinerator.

14. A method for generating electric power by combusting waste products, the method comprising:

combusting waste products in a gasification and melt combustion system to generate exhaust gas having a high temperature;

introducing said exhaust gas into a heat exchanger to heat an intermediate gas;

introducing said exhaust gas from said heat exchanger into a waste heat boiler to generate a superheated stream;

introducing said superheated steam from said waste heat boiler into a superheated steam heater;

introducing said heated intermediate gas into said superheated steam heater to heat said superheated stream;

supplying said heated superheated steam to a steam turbine coupled to a generator to generate electric power; and supplying said heated intermediate gas from said superheated steam heater into said gasification and melt combustion system after heating said superheated steam.

15. A method for generating electric power by combusting waste products, the method comprising:

combusting waste products in a gasification and melt combustion system to generate exhaust gas having a high temperature;

introducing said exhaust gas into a heat exchanger to heat air;

introducing said exhaust gas from said heat exchanger into a waste heat boiler to generate a superheated steam;

introducing said superheated steam into a superheated steam heater;

introducing said heated air into said superheated steam heater to heat said superheated steam;

supplying said heated superheated steam to a steam turbine coupled to a generator to generate electric power; and supplying said heated air from said superheated stream heater to said gasification and melt combustion system.

16. A method according to claim 14, wherein heat transfer tubes of said heat exchanger comprises one of heat-resistant cast steel and ceramics.

17. A method according to claim or 14 wherein heat transfer tubes of said heat exchanger comprises heat-resistant metal.

18. A method according to claim 14, wherein said heat exchanger comprises a bayonet type heat exchanger.

19. A method according to claim 14, wherein the surface temperature of heat transfer tubes of said heat exchanger is maintained at 700° C. or higher.

20. A method according to claim 18, wherein heat transfer tubes of said heat exchanger comprises one of heat-resistant cast steel and ceramics.

21. A method according to claim 15, wherein said air is preheated by said exhaust gas in a preheater before being supplied to said heat exchanger.

22. An apparatus for generating electric power by combusting waste products, the apparatus comprising:

a gasification and melt combustion system for combusting waste products to generate exhaust gas having a high temperature;

a heat exchanger for heating an intermediate gas by heat exchange between said exhaust gas discharged from said gasification and melt combustion system and said intermediate gas;

a waste heat boiler downstream of said heat exchanger so as to receive said exhaust gas discharged from said heat exchanger for generating a superheated steam;

a superheated steam heater for heating said superheated steam by heat exchange between said heated intermediate gas and said superheated steam;

a steam turbine coupled to a generator, said heated superheated steam being supplied to said steam turbine to generate electric power; and a line for supplying said heated intermediate gas from said superheated steam heater to said gasification and melt combustion system.

23. An apparatus for generating electric power by combusting waste products, the apparatus comprising:

a gasification and melt combustion system for combusting waste products to generate exhaust gas having a high temperature;

a heat exchanger for heating air by heat exchange between said exhaust gas discharged from said gasification and melt combustion system and said air;

a waste heat boiler downstream of said heat exchanger so as to receive said exhaust gas discharged from said heat exchanger for generating a superheated steam;

a superheated steam heater for heating said superheated steam by heat exchange between said heated intermediate gas and said superheated steam;

a steam turbine coupled to a generator, said heated superheated steam being supplied to said steam turbine to generate electric power; and a line for supplying said heated air from said superheated steam heater to said gasification and melt combustion system.

24. An apparatus according to claim 22, wherein heat transfer tubes of said heat exchanger comprises one of heat-resistant cast steel and ceramics.

25. An apparatus according to claim 22, wherein heat transfer tubes of said heat exchanger comprises heat- resistant metal.

26. An apparatus according to claim or 22, wherein said heat exchanger comprises a boyonet type heat exchanger.

27. An apparatus according to claim 22, wherein the surface temperature of heat transfer tubes of said heat exchanger is maintained at 700° C. or higher.

28. An apparatus according to claim 22, wherein said intermediate ghas is preheated by said exhaust gas in a preheater before being supplied to said heat exchanger.

29. An apparatus according to claim 23, wherein said air is preheated by said exhaust gas in a preheater before being supplied to said heat exchanger.

30. A method according to claim 15, wherein heat transfer tubes of said heat exchanger comprises one of heat-resistant cast steel and ceramics.

31. A method according to claim 15, wherein heat transfer tubes of said heat exchanger comprises heat-resistant metal.

32. A method according to claim 15, wherein said heat exchager comprises a bayonet type heat exchanger.

33. A method according to claim 15, wherein the surface temperature of heat transfer tubes of said heat exchanger is maintained at 700°C. or higher.

34. A method according to claim 23, wherein heat transfer tubes of said heat exchanger comprises one of heat-resistant cast steel and ceramics.

35. An apparatus according to claim 23, wherein heat transfer tubes of said heat exchanger comprises heat-resistant metal.

36. A method according to claim 23, wherein said heat exchanger comprises a bayonet type heat exchanger.

37. An apparatus according to claim 23, wherein the surface temperature of heat transfer tubes of said heat exchanger in maintained at 700°C. or higher.

38. An apparatus for generating electric power by combusting waste products, the apparatus cmprising:

an incinerator for combusting waste products to generate exhaust gas having a high temperature;

a preheater for receiving said exhaust gas, wherein a intermediate gas is preheated by said exhaust gas in said preheater;

a heat exchanger downstream of said incinerator and connected to said incinerator and said preheater so as to receive said exhaust gas from said incinerator for heating said preheated intermediate gas by heat exchange between said exhaust gas from said incinerator and said intermediate gas, and so as to supply said exhaust gas received from said incinerator into said preheater;

a waste heat boiler downstream of said heat exchanger and connected to said heat exchanger so as to receive said exhaust gas from said heat exchanger for generating a superheated steam;

a heater connected to said waste heat boiler so as to receive said superheated steam and connected to said heat exchanger so as to receive said heated intermediate gas for heating said superheated steam by heat exchange between said heated intermediate gas and said superheated steam;

a steam turbine downstream of said heater and coupled to a generator, said heated superheated steam being supplied to said steam turbine to generate electric power; and a line for supplying said heated intermediate gas discharged from said superheated steam heater into said incinerator.

39. An apparatus according to claim 38, wherein heat transfer tubes of said heat exchanger which contact with said exhaust gas comprise one of heat-resistant cast steel and ceramics.

40. An apparatus according to claim 38, wherein heat transfer tubes of said heat exchanger which contact with said exhaust gas comprise heat-resistant metal.

41. An apparatus according to claim 38, wherein said heat exchanger comprises a bayonet heat exchanger.

42. An apparatus according to claim 38, wherein the surface temperature of heat transfer tubes of said heat exchanger is maintained at 700° C. or higher.

43. An apparatus for generating electric power by combustion waste products, the apparatus comprising:

a gasification and melt combustion system for combusting waste products to generate exhaust gas having a high temperature;

a heat exchanger downstream of said gasification and melt combustion system and connected to said gasification and melt combustion system so as to receive said exhaust gas from said gasification and melt combustion system for heating an imtermediate gas by heat exchange between said exhaust gas discharged from said gasification and melt combustion system and said intermediate gas;

a waste heat boiler downstream of said heat exchanger and connected to said heat exchanger so as to receive said exhaust gas discharged from said heat exchanger for generating a superheated steam;

a superheated steam heater connected to said waste heat boiler so as to receive said superheated steam from said waste heat boiler, and connected to said heat exchanger so as to receive said heated intermediate gas for heating said superheated steam by heat exchange between said heated intermediate gas and said superheated steam;

a steam turbine downstream of said superheated steam heater and coupled to a generator, said heated superheated steam being supplied to said steam turbine to generate electric power; and a line for supplying said heated intermediate gas from said superheated steam heater to said gasification and melt combustion system.

44. An apparatus according to claim 43, wherein heat transfer tubes of said heat exchanger which contact with said exhaust gas comprise one of heat-resistant cast steal and ceramics.

45. An apparatus according to claim 43, wherein heat transfer tubes of said heat exchanger which contact with said exhaust gas comprise heat-resistant metal.

46. An apparatus according to claim 43, wherein said heat exchanger comprises a bayonet heat exchanger.

47. An apparatus according to claim 43, wherein the surface temperature of heat transfer tubes of said heat exchanger is maintained at 700° C. or higher.

48. An apparatus according to claim 43, wherein said intermediate gas is preheated by said exhaust gas in a preheated before being supplied to said heat exchanger.

49. A method for generating electric power by combusting waste products, the method comprising:

combusting waste products in a combustor to generate exhaust gas having a high temperature;

introducing said exhaust gas into a heat exchanger to heat an intermediate gas by heat exchange;

introducing said exhaust gas from said heat exchanger into a waste heat boiler to generate a superheated steam;

introducing said superheated steam from said waste heat boiler into a superheated steam heater;

introducing said heated intermediate gas into said superheated steam heater to heat said superheated steam;

supplying said heated superheated steam to a steam turbine coupled to a generator to generate electric power; and using said heated intermediate gas from said superheated steam heater as combustion gas in said combustor after said heated intermediate gas heats said superheated steam.

50. A method according to claim 49, wherein said intermediate gas is preheated by said exhaust gas in a preheater before being supplied to said heat exchanger.

51. A method according to claim 49, wherein heat transfer tubes of said heat exchanger which contact with said exhaust gas comprise one of heat-resistant cast steel and ceramics.

52. A method according to claim 49, wherein heat transfer tubes of said heat exchanger which contact with said exhaust gas comprise heat-resistant metal.

53. A method according to cliam 49, wherein said heat exchanger comprises a bayonet heat exchanger.

54. A method according to claim 49, wherein said combustor comprises one of an incinerator and a gasification and melt combustion system.

55. An apparatus for generating electric power by combusting waste products, the apparatus comprising:

a combustor for combusting waste products to generate exhaust gas having a high temperature;

a heat exchanger downstream of a said combustor and connected to said combustor so as to reveive said exhaust gas from said combustor for heating an intermediate gas by heat exchange between said exhaust gas discharged from said combustor and said intermediate gas;

a waste heat boiler downstream of said heat exchanger and connected to said heat exchanger so as to receive said exhaust gas from said heat exchanger for generating a superheated steam;

a heater connncected to said waste heat boiler so as to receive said superheated steam and connected to said heat exchanger so as to receive heated intermediate has for heating said superheated steam by heat exchange between said heated intermediate gas and said superheated steam;

a steam turbine downstream of said heater and coupled to a generator, said heated superheated steam being supplied to said steam turbine to generate electric power; and a component for using said heated intermediate gas discharged from said superheated steam heater as combustion gas in said combustor.

56. An apparatus according to claim 55, wherein said intermediate gas is preheated by said exhaust gas in a preheater before being supplied to said heat exchanger.

57. An apparatus according to claim 55, wherein heat transfer tubes of said heat exchanger which contact with said exhaust gas comprise one of heat-resistant cast steel and ceramics.

58. An apparatus according to claim 55, wherein heat transfer tubes of said heat exchanger which contact with said exhaust gas comprise heat-resistant metal.

59. An apparatus according to claim 55, wherein said heat exchanger comprises a bayonet heat exchanger.

60. An apparatus according to claim 55, wherein said combustor comprises one of an incinerator and a gasification and melt combustion system.

* * * * *

UNITED STATES PATENT AND TRADEMARK OFFICE
CERTIFICATE OF CORRECTION

PATENT NO.    : 6,381,962 B1
DATED         : May 7, 2002
INVENTOR(S)   : Takahiro Ohshita et al.

It is certified that error appears in the above-identified patent and that said Letters Patent is hereby corrected as shown below:

Column 12,
Line 30, change "cobusting" to -- combusting --.

Column 13,
Line 35, delete "or".
Beginning at line 43, in claim 20, delete in its entirety and replace with the following rewritten claim 20:
-- A method according to claim 14, wherein said intermediate gas is preheated by said exhaust gas in a preheater before being supplied to said heat exchanger. --

Column 14,
Line 16, delete "interme-"
Line 17, change "diate gas" to -- air --.
Line 29, delete "or".
Line 35, change "ghas" to -- gas --.
Line 50, change "A method" to -- An apparatus --.
Line 56, change "A method" to -- An apparatus --.
Line 60, change "in" to -- is --.
Line 62, change "cmprising:" to -- comprising: --;
Line 65, change "a" to -- an --.

Column 16,
Line 57, change "reveive" to -- receive --;
Line 66, change "conncected" to -- connected --;

Column 17,
Line 1, change "has" to -- gas --.

Signed and Sealed this

Sixteenth Day of July, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.     : 6,381,962 B1
DATED          : May 7, 2002
INVENTOR(S)    : Takahiro Ohshita et al.

It is certified that error appears in the above-identified patent and that said Letters Patent is hereby corrected as shown below:

<u>Column 12,</u>
Line 67, change "stream" to -- steam. --

<u>Column 13,</u>
Lines 4 and 30, change "stream" to -- steam. --

Signed and Sealed this

Nineteenth Day of August, 2003

JAMES E. ROGAN
*Director of the United States Patent and Trademark Office*